United States Patent
Styles et al.

(10) Patent No.: US 7,765,222 B2
(45) Date of Patent: Jul. 27, 2010

(54) QUERY TRANSFORMATION

(75) Inventors: Michael E. Styles, Osgoode (CA); Henk Cazemier, Spencerville (CA)

(73) Assignee: International Business Machines Corporation, Armonk, NY (US)

(*) Notice: Subject to any disclaimer, the term of this patent is extended or adjusted under 35 U.S.C. 154(b) by 578 days.

(21) Appl. No.: 10/854,638

(22) Filed: May 27, 2004

(65) Prior Publication Data

US 2005/0015369 A1     Jan. 20, 2005

(30) Foreign Application Priority Data

May 27, 2003   (CA)   ................................. 2429910

(51) Int. Cl.
  *G06F 7/00*   (2006.01)
  *G06F 17/30*  (2006.01)

(52) U.S. Cl. ....................................... 707/759

(58) Field of Classification Search ............. 707/1–10, 707/100–104.1, 200–205, 999.004
See application file for complete search history.

(56) References Cited

U.S. PATENT DOCUMENTS

| | | | |
|---|---|---|---|
| 5,963,936 A | 10/1999 | Cochrane et al. | |
| 6,009,432 A | 12/1999 | Tarin | |
| 6,341,281 B1 | 1/2002 | MacNicol et al. | |
| 6,345,272 B1 | 2/2002 | Witkowski et al. | |
| 6,370,524 B1 | 4/2002 | Witkowski | |
| 6,438,537 B1 | 8/2002 | Netz et al. | |
| 6,460,027 B1 | 10/2002 | Cochrane et al. | |
| 6,519,604 B1 | 2/2003 | Acharya et al. | |
| 6,567,802 B1 | 5/2003 | Popa et al. | |
| 6,574,623 B1 | 6/2003 | Leung et al. | |
| 6,609,123 B1 | 8/2003 | Cazemier et al. | |
| 6,611,838 B1 | 8/2003 | Ignat et al. | |
| 6,651,055 B1 | 11/2003 | Kilmer et al. | |
| 6,684,204 B1* | 1/2004 | Lal | 707/3 |
| 6,714,928 B1* | 3/2004 | Calow | 707/4 |
| 6,847,962 B1 | 1/2005 | Cochrane et al. | |
| 6,934,712 B2* | 8/2005 | Kiernan et al. | 707/102 |
| 7,120,645 B2* | 10/2006 | Manikutty et al. | 707/102 |
| 7,133,865 B1 | 11/2006 | Pedersen et al. | |
| 7,315,849 B2 | 1/2008 | Bakalash et al. | |
| 7,318,058 B2 | 1/2008 | Styles | |

(Continued)

FOREIGN PATENT DOCUMENTS

EP     1081611 A2   3/2001

(Continued)

OTHER PUBLICATIONS

European Search Report, dated Aug. 17, 2005, 4 pages.

(Continued)

*Primary Examiner*—Hosain T Alam
*Assistant Examiner*—Navneet K Ahluwalia
(74) *Attorney, Agent, or Firm*—Stephen J. Walder, Jr.; Erin C. Ming (57) ABSTRACT

A mechanism for structured query language tagging is provided. The mechanism comprises a parsing unit for parsing a structured query language string into components, an analysis unit for analyzing the components and applying associated tags to the components, and a string generation unit for concatenating the components with associated tags into a new string.

20 Claims, 6 Drawing Sheets

U.S. PATENT DOCUMENTS

| | | | |
|---|---|---|---|
| 7,428,532 | B2 | 9/2008 | Styles |
| 2001/0037345 | A1* | 11/2001 | Kiernan et al. ............... 707/513 |
| 2002/0059203 | A1 | 5/2002 | Witkowski et al. |
| 2002/0087524 | A1 | 7/2002 | Leathers |
| 2002/0107840 | A1 | 8/2002 | Rishe |
| 2002/0188600 | A1 | 12/2002 | Lindsay et al. |
| 2003/0066051 | A1 | 4/2003 | Karr et al. |
| 2003/0101169 | A1* | 5/2003 | Bhatt et al. ..................... 707/3 |
| 2003/0115194 | A1 | 6/2003 | Pitts et al. |
| 2004/0133567 | A1 | 7/2004 | Witkowski et al. |
| 2004/0181537 | A1* | 9/2004 | Chawla et al. ............... 707/100 |
| 2005/0010569 | A1 | 1/2005 | Styles |
| 2005/0010570 | A1 | 1/2005 | Styles |
| 2005/0038782 | A1 | 2/2005 | Styles et al. |

FOREIGN PATENT DOCUMENTS

| | | |
|---|---|---|
| WO | WO 03/012698 A2 | 2/2003 |
| WO | WO 03/038662 A1 | 5/2003 |

OTHER PUBLICATIONS

"European Search Report", 04012635.1, Aug. 8, 2005, 4 pages.
"European Search Report", Jul. 28, 2005 for Application No. EP 04012615, 6 pages.
"European Search Report", Jul. 28, 2005 for Application No. EP04012613, 2 pages.
"European Search Report", EP04076566, Aug. 8, 2005, 4 pages.
"ORACLE Technology Network—Discussion Forums", Online, http://forums.oracle.com/forums/thread.jspa?messageIDS= 343362񓵂, XP-002337527, retrieved Jul. 22, 2005.
Chiou, A S. et al., "Optimization for queries with holistic functions", Abstract, Database Systems for Advanced Applications, Proceedings of the Seventh International Conference on Volume, Piscataway, New Jersey, Apr. 18, 2001, pp. 327-334.
Johnson, Theodore et al., "Extending Complex Ad-Hoc OLAP", Association for Computing Machinery, Proceedings of the 8th International Conference on Information Knowledge Management, CIKM '99, Kansas City, Missouri, Nov. 2-6, 1999, ACM CIKM International Conference on Information and Knowledge Management, New York, Nov. 1999 , pp. 170-179.
Lee, Sang-Won, "SQL/OLAP", PowerPoint presentation, http://vldb.skku.ac.kr/vldb/talk/sql-olap.ppt, Jul. 12, 2001, 32 pages.
Pirahesh, Hamid et al., "A Rule Engine for Query Transformation in Starburst and IBM DB2 C/S DBMS", Published Apr. 1997, pp. 391-400.
Ross, Kenneth A. et al., "Complex Aggregation at Multiple Granularities", Lecture Notes in Computer Science, vol. 1377, 1998, pp. 263-277.
Schwarz, Holger et al., "Improving the Processing of Decision Support Queries: The Case for a DSS Optimizer", Proceedings, International Database Engineering and Applications Symposium, Jul. 16, 2001, pp. 177-186, XP002275210.
Schwarz, Holger et al., "Improving the Processing of Decision Support Queries: Strategies for a DSS Optimizer", University Stuttgart, Technical Report TR-2001-02, Germany, May 2001, pp. 1-20.
Sordi, J.J., "The Query Management Facility", IBM Systems Journal, 1984, vol. 23, No. 2, pp. 126-150.
Winter, Richard, "SQL-99's New OLAP Functions", Intelligent Enterprise Magazine, Online, vol. 3, No. 2, Jan. 20, 2000, XP002337528, 10 pages.
Zemke, Fred et al., "Introduction to OLAP Functions", Online! Apr. 12, 1999, XP002338253, pp. 1-38.
Liebling, Michael, "Matlab vs. IDL", Biomedical Imaging Group, Feb. 28, 2002, 5 pages.

* cited by examiner

QUERY TRANSFORMATION

FIELD OF THE INVENTION

The invention relates generally to data access middleware, and in particular to a system and method of query transformation.

BACKGROUND OF THE INVENTION

A typical data access environment has a multi-tier architecture. For description purposes, it can be separated into three distinct tiers:
  Web server
  Applications
  Data The tiers are based on business function, and are typically separated by firewalls. Client software, such as a browser or a report-authoring tool, sits above the tiers.

The web server contains a firewall and one or more gateways. All web communication is performed through a gateway. A gateway is responsible for passing on requests to the application server, in tier 2, for execution.

The applications tier contains one or more application servers. The application server runs requests, such as reports and queries that are forwarded by a gateway running on the web server. Typically, one of the components of the applications tier is a query engine, which is data access middleware that provides universal data access to a variety of heterogeneous database systems. The query engine formulates queries (typically SQL) and passes them on to the data tier, through a native database API (such as ODBC) for execution.

The data tier contains database management systems (DBMS), which manage raw data stored in a database. Examples of such systems include Oracle, DB2, and Microsoft SQL Server.

Although a multi-tier architecture can be configured in several different ways, a typical configuration places each tier on a separate computer (server). A database server is typically a "high end" server, and thus can process queries at a relatively fast speed. An application server cannot generally process queries as quickly as a database server.

In order to solve many business questions, a query engine may generate SQL queries that utilize the SQL/OLAP technology introduced in the SQL-99 standard. However, many database systems do not support this technology. Thus, the SQL queries would have to be performed on the report server that is generally slower than the database server. It is desirable to have as much processing performed on the database server.

There is a need to prevent or reduce the amount of local (application server) processing required to process a query. In the past, the application would be responsible for generating separate SQL queries involving the GROUP BY operator to compute aggregates over different partitions and stitching together the results. Quite often, this is quite difficult since it involves multiple queries and post processing.

One way of overcoming this problem is for the query engine to generate separate GROUP BY queries for aggregates computed over different partitions, generate a separate query to retrieve detail information, and then stitch together the results to produce the desired report. Unfortunately, this problem requires processing time on the report server. It is desirable to have a way of transferring the SQL queries to the database server with minimal processing on the report server.

It is desirable to produce a meaningful result from a many-to-one-to-many relationship using a single structured query language (SQL) statement. In the past, many-to-one-to-many query relationships are dealt with by issuing two separate queries and then the stitching the results together.

SUMMARY OF THE INVENTION

It is an object of the present invention to provide a method of query transformation in a database system that does not support SQL-99 standard.

In accordance with an embodiment of the present invention, there is provided a structured query language tagging system for tagging structured query language commands. The system comprises a parsing unit for parsing a structured query language string into components, an analysis unit for analyzing the components and applying associated tags to the components, and a string generation unit for concatenating the components with associated tags into a new string.

In accordance with another embodiment of the present invention, there is provided a method of tagging structured query language commands. The method comprises the steps of parsing an incoming structured query language statement and producing an input tree representation, and traversing the input tree representation while generating a structured query language string with embedded extensible markup language tags.

In accordance with an embodiment of the present invention, there is provided a method of tagging structured query language commands. The method comprises the steps of parsing a structured query language string into components, analyzing the components and applying associated tags to the components, and concatenating the components with associated tags into a new string.

In accordance with an embodiment of the present invention, there is provided a WITH clause transformation system comprising a WITH clause analysis module for analysing structured query language/online analytical programming (SQL/OLAP) windowed aggregates that are not supported by a target database system, and a WITH clause transformation module for transforming SQL/OLAP windowed aggregates into semantically equivalent standard aggregate functions that are supported by the target database system.

In accordance with an embodiment of the present invention, there is provided a method of WITH clause transformation. The method comprises the steps of analysing a query containing SQL/OLAP windowed aggregates that are not supported by a target database system, and transforming the query into a semantically equivalent query, having a WITH clause, that is supported by the target database system.

In accordance with an embodiment of the present invention, there is provided a parallel detail join system for merging elements in a plurality of tables. The system comprises a parallel detail analysis module for obtaining related elements in a plurality of tables, and a parallel detail transformation module for merging the related elements in a singe table. The related elements merged such that the number of rows of a single element equals a largest cardinality of the single element and the number of columns equals the number of tables.

In accordance with an embodiment of the present invention, there is provided a method of merging elements in a plurality of tables. The method comprises the steps of obtaining related elements in a plurality of tables, and merging the elements are merged into a single table such that the number of rows of a single element equals a largest cardinality of the single element and the number of columns equals the number of tables.

In accordance with an embodiment of the present invention, there is provided a method of merging elements in a plurality of tables. The method comprises the steps of analyzing elements in a plurality of tables, creating a single table, and placing the properties of each respective element in the single table in a number of rows equal to a largest cardinality of the respective element. The single table having a number of columns equal to the number of tables plus one, and a number of rows equal to the total of the largest cardinality of the elements in each table.

DETAILED DESCRIPTION OF THE PREFERRED EMBODIMENTS

Figure 1:
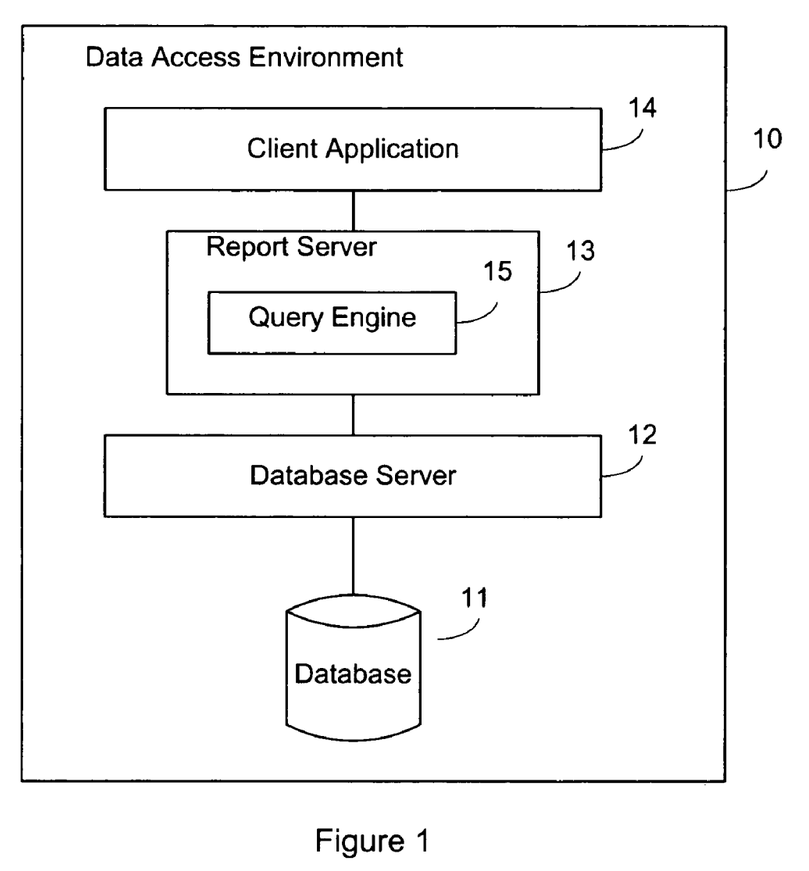
FIG. 1 shows a typical data access environment.

FIG. 1 shows a typical data access environment 10 for processing data. Typically, data is stored in a database 11. A DBMS running on a database server 12 accesses the raw data stored in the database 11. A query engine 15, running on an application server 12 is used to generate reports on the raw data and instruct the DBMS on the database server 12 to obtain information pertaining to the raw data in the database 11. The query engine 15 provides universal data access to a variety of heterogeneous database systems. An end user uses a client application 14, running on a client workstation, to facilitate application server 13 operations.

In order to solve many business questions, a query engine 15 generates SQL queries that utilize the SQL/online analytical programming (OLAP) technology introduced in the SQL-99 standard. These SQL queries include SQL/OLAP functions (windowed aggregates). However, many database systems 12 do not support this technology. In order to prevent or reduce the amount of local (application server) processing required to process these types of queries, the query engine 15 attempts to generate semantically equivalent queries that can be processed on the database server 12 by the target database system. These semantically equivalent queries include standard aggregate functions and the GROUP BY operator.

Figure 2:
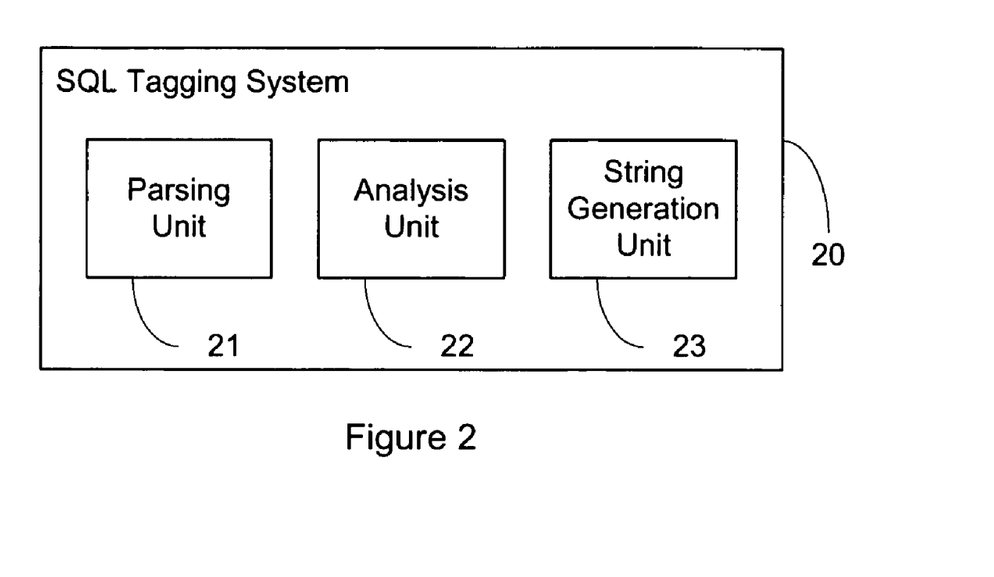
FIG. 2 shows an example of a structured query language tagging system, in accordance with an embodiment of the present invention.

FIG. 2 shows an example of a structured query language (SQL) tagging system 20, in accordance with an embodiment of the present invention. The SQL tagging system 20 comprises a parsing unit 21 for parsing a structured query language string into components, an analysis unit 22 for analyzing the components and applying associated tags to the components, and a string generation unit 23 for concatenating the components with associated tags into a new string. Preferably, the parsing unit 21 comprises an extensible markup language (XML) parser built into a query engine application that implements the SQL tagging system 20. Alternatively, the SQL tagging system 20 may comprise a separately implemented SQL parser. The tagging of components may be performed by a universal data access (UDA). Components may be added to, or removed from, the SQL tagging system 20.

The SQL tagging system 20 may be implemented as a component of the report server 13, or as a component of the query engine 15 to a data access environment 10. Alternatively, the SQL tagging system 20 may be implemented as a component of the database server 12. A further alternative has the SQL tagging system 20 implemented as a separate component between the report server 13 and the database server 12 in a data access environment 10.

Figure 3:
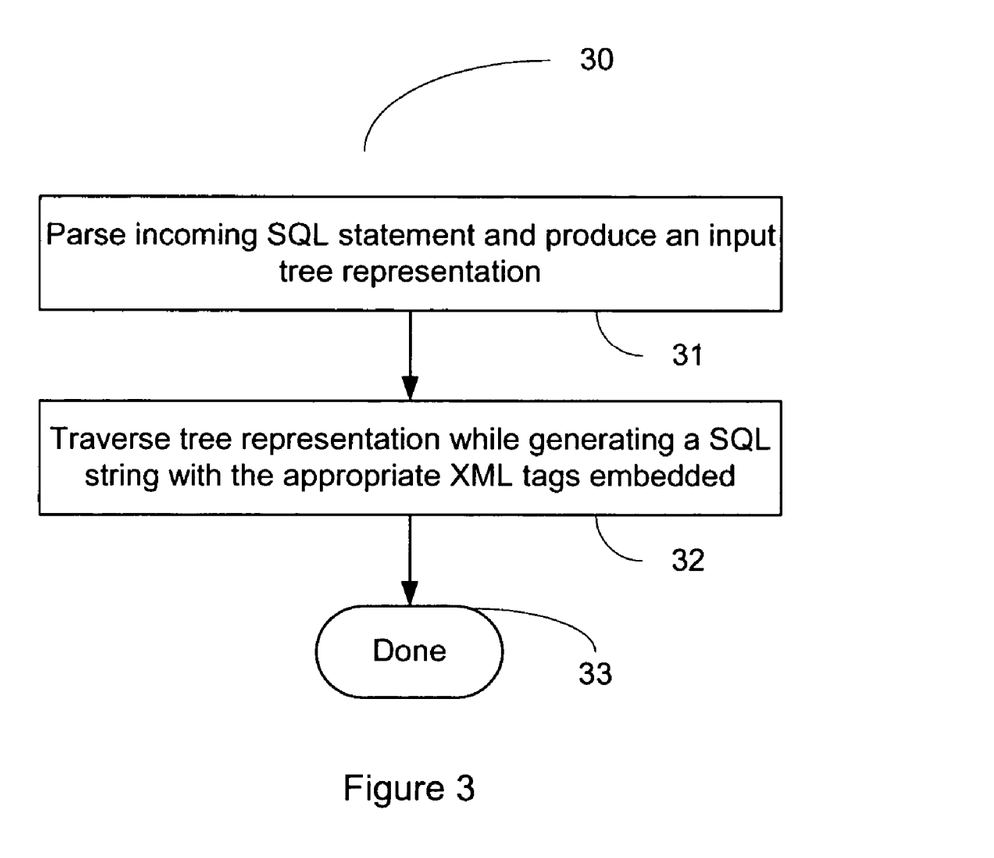
FIG. 3 shows in a flowchart an example of a method of tagging structured query language commands, in accordance with the structured query language tagging system.

FIG. 3 shows in a flowchart an example of a method of tagging SQL commands (30), in accordance with the structured query language tagging system 20. The method (30) begins with parsing an incoming SQL statement and producing an input tree (ITREE) representation (31). Next, the ITREE is traversed while generating a SQL string with the appropriate XML tags embedded (32). The method (30) is done (33).

Advantageously, the SQL tagging system 20 allows various components of a SQL statement to be extracted and analyzed by a query engine. The query engine can then us this information to simplify the SQL as much as possible, keeping only the minimal set of tables and joins needed to obtain values for the selected query items.

Furthermore, as described above, the query engine which implements the SQL tagging system 20 does not need to implement a full-blown SQL parser. The query engine can use its existing XML parser to construct a document object model (DOM) tree for the purpose of extraction and analysis of various components of a SQL statement.

Furthermore, this embodiment of the invention saves on development and maintenance costs since, as mentioned above, CQE does not need to develop (and therefore maintain) a SQL parser for producing a DOM tree. New functionality in the SQL language can be handled easily by simply introducing new XML tags.

Figure 4:
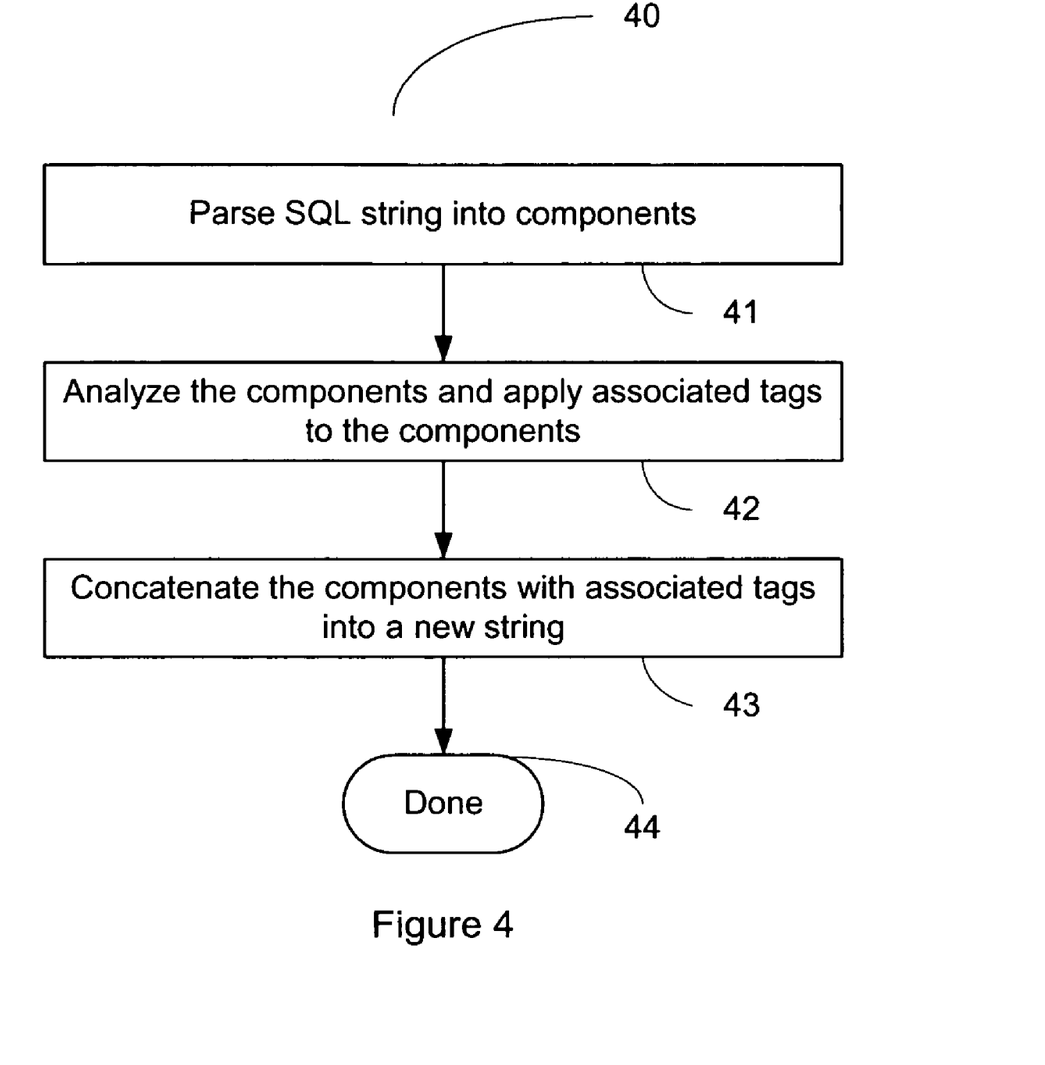
FIG. 4 shows in a flowchart another example of a method of tagging structured query language commands, in accordance with the structured query language tagging system.

FIG. 4 shows in a flowchart another example of a method of tagging structured query language commands (40), in accordance with the structured query language system 20. The method (40) begins with parsing a SQL string into components (41). Once the components are parsed (41), the components may be analysed to apply associated tags to the components (42). Once the associated tags are applied to the components, the components with associated tags may be concatenated into a new string (43). The method (40) is done (44) and a query engine may use the new string. Steps may be added to, or removed from, the method (40).

In one embodiment of the SQL tagging system 20, SQL tagging involves parsing a SQL string and producing a new string containing XML tags. An example of a collection of tags is given below:

| XML Tag | Description |
| --- | --- |
| <field> | Identifies a value expression in select list. |
| <column> | Identifies a column reference in value expression. |
| <alias> | Identifies a derived column name for value expression in select list or a correlation name appearing in the FROM clause. |
| <subquery> | Identifies a subquery. |
| <orderby> | Identifies a list of one or more sort columns in an ORDER BY clause |
| <groupby> | Identifies a list of one or more grouping columns in an GROUP BY clause |
| <having> | Identifies a HAVING clause predicate. |
| <summaryfilter> | Identifies a FILTER (summary filter) clause predicate. |
| <window> | Identifies a WINDOW clause. |
| <distinct> | Identifies the DISTINCT qualifier in a select list. |
| <qualify> | Identifies a QUALIFY predicate. |
| <filter> | Identifies a WHERE clause predicate. |
| <joinedtable> | Identifies a joined table (INNER JOIN, LEFT OUTER JOIN, RIGHT OUTER JOIN, FULL OUTER JOIN, or CROSS JOIN) in the FROM clause. |
| <derivedtable> | Identifies a derived table in the FROM clause. |
| <table> | Identifies a simple table reference in the FROM clause. |
| <nativesql> | Identifies database-specific SQL. |
| <passthroughSQL> | Identifies standalone database-specific SQL. |
| <procedure> | Identifies a stored procedure call. |
| <with> | Identifies a WITH clause specification. |
| <view> | Identifies a common table expression referenced in the FROM clause. |

EXAMPLE

Original SQL

```
SELECT   C1, SUM( C2 ) OVER ( )
FROM (   SELECT SNO C1, SUM( QTY ) OVER ( PARTITION
         BY SNO ) C2 FROM SUPPLY ) T1
WHERE    C2 > 1000
```

Tagged SQL

```
SELECT   <field><column>C1</column></field>,
         <field>SUM( <column>C2</column> ) OVER ( )</field>
FROM     <derivedtable> (
         SELECT <field><column>SNO</column><alias>C1</alias>
         </field>,
            <field>
               SUM( <column>QTY</column> )
               OVER ( PARTITION BY <column>SNO</column> )
               <alias>C2</alias>
            </field>
         FROM <table>SUPPLY</table> ) </derivedtable> <alias>T1
         </alias>
WHERE    <filter><column>C2</column> > 1000</filter>
```

Explanation

The above example shows the introduction of specialized XML tags (in bold) into the original SQL statement. Each tag identifies a particular part of the SQL statement. Advantageously, the tagged SQL can be easily parsed by any XML parser (the original SQL cannot) to produce a DOM tree.

WITH Clause Transformation

Figure 5:
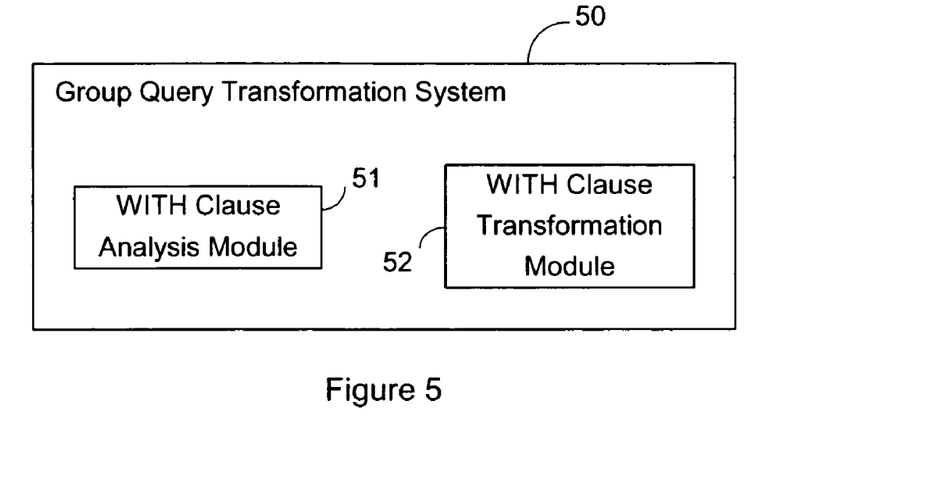
FIG. 5 shows a WITH clause query transformation system, in accordance with an embodiment of the present invention.

FIG. 5 shows a WITH clause transformation system 50, in accordance with an embodiment of the present invention. The WITH clause query transformation system 50 comprises a WITH clause analysis module 51 for analysing SQL/OLAP windowed aggregates that are not supported by a target database system, and a WITH clause transformation module 52 for transforming SQL/OLAP windowed aggregates into semantically equivalent standard aggregate functions that are supported by the target database system.

The WITH clause transformation system 50 may be implemented as a sub-system of the query engine 15 in the data access environment 10. This transformation system 50 may generate queries that can be processed in their entirety on the database server 12, or queries that require processing on both the application server 13 and the database server 12.

Advantageously, the WITH clause transformation system 50 reduces processing that might otherwise be required on the application server, thereby improving performance in many cases. The WITH clause transformation system uses the WITH clause and common table expressions to express a semantically equivalent query.

The group query transformation of a SQL-99 query involves mapping windowed OLAP functions into a semantically equivalent query involving derived tables and the standard WITH clause.

Figure 6:
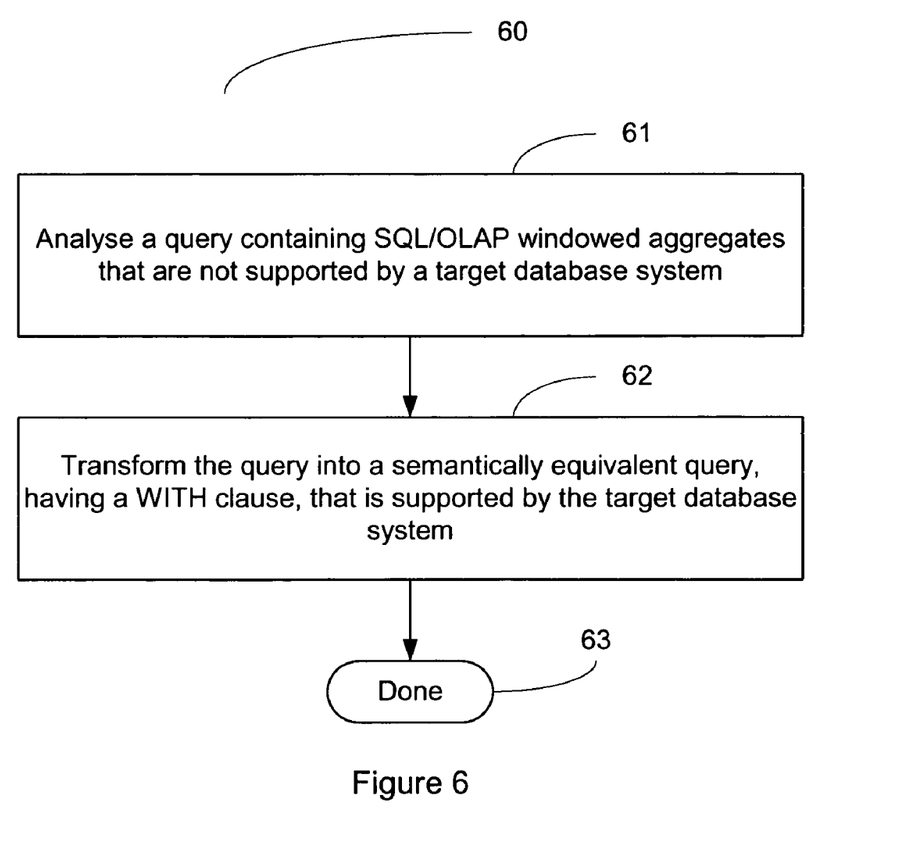
FIG. 6 shows in a flowchart an example of a method of structured query language group transformation, in accordance with an embodiment of the group query transformation system.

FIG. 6 shows in a flowchart an example of a method of WITH clause transformation (60), in accordance with an embodiment of the WITH clause transformation system 50. The method (60) begins with analysing a query containing SQL/OLAP windowed aggregates that are not supported by a target database system (61). Next, the query is transformed into a semantically equivalent query, having a WITH clause, that is supported by the target database system (62). The method (60) is done (63).

Example 1

Original Query

```
SELECT   SNO, PNO, SUM( QTY ) OVER ( PARTITION
         BY SNO ),
         SUM( QTY ) OVER ( PARTITION BY SNO, PNO )
FROM     SUPPLY
```

-continued

Transformed Query

```
WITH T0 AS ( SELECT   SNO C0, PNO C1, SUM( QTY ) C2
              FROM     SUPPLY
              GROUP    BY SNO, PNO ),
     T1 AS ( SELECT   C0, SUM( C2 ) C1
              FROM     T0
              GROUP    BY C0 ),
     T2 AS ( SELECT   SNO C0, PNO C1
              FROM     SUPPLY )
SELECT    T2.C0, T2.C1, T0.C1, T1.C2
FROM      T0, T1, T2
WHERE     ( T2.C0 = T0.C0 OR ( T2.C0 IS NULL AND T0.C0 IS
          NULL ))
AND       ( T2.C0 = T1.C0 OR ( T2.C0 IS NULL AND T1.C0 IS
          NULL ))
AND       ( T2.C1 = T1.C1 OR ( T2.C1 IS NULL AND T1.C1 IS
          NULL ))
```

Example 2

Original Query

```
SELECT    DISTINCT SNO, PNO,
          SUM( QTY ) OVER ( PARTITION BY SNO ),
          SUM( QTY ) OVER ( PARTITION BY SNO, PNO )
FROM      SUPPLY
```
Transformed Query
```
WITH T0 AS (    SELECT    SNO C0, PNO C1, SUM( QTY ) C2
                FROM SUPPLY
                GROUP     BY SNO, PNO ),
     T1 AS (    SELECT    C0, SUM( C2 ) C1
                FROM T0
                GROUP     BY C0 )
SELECT    T2.C0, T2.C1, T0.C1, T1.C2
FROM      T0, T1, T2
WHERE     (T1.C0 = T0.C0 OR ( T1.C0 IS NULL AND T0.C0
          IS NULL ))
```

Example 3

Original Query
```
SELECT    SNO, PNO, QTY,
          SUM( QTY ) OVER ( ), SUM( QTY ) OVER ( PARTITION
          BY SNO ),
          SUM( QTY ) OVER ( PARTITION BY SNO, PNO ),
          RANK( ) OVER ( ORDER BY QTY DESC )
FROM      SUPPLY
```
Transformed Query
```
WITH      T0 AS (   SELECT    SNO C0, PNO C1, SUM( QTY ) C2
                    FROM      SUPPLY
                    GROUP     BY SNO, PNO ),
          T1 AS (   SELECT    SNO C0, SUM( C2 ) C1
                    FROM      T0
                    GROUP     BY SNO ),
          T2 AS (   SELECT    SUM( C1 ) C2
                    FROM      T1 ),
          T3 AS (   SELECT    SNO C0, PNO C1, QTY C2
                    FROM      SUPPLY )
SELECT    T0.C0, T0.C1, T0.C2, T2.C0, T1.C1, T0.C2, RANK( )
OVER ( ORDER BY T3.C2 DESC )
FROM      T0, T1, T2, T3
WHERE     ( T3.C0 = T1.C0 OR ( T3.C0 IS NULL AND T1.C0 IS
          NULL ))
```

-continued

```
AND       ( T3.C0 = T2.C0 OR ( T3.C0 IS NULL AND T2.C0 IS
          NULL ))
AND       ( T3.C1 = T2.C1 OR ( T3.C1 IS NULL AND T2.C1 IS
          NULL ))
```

Parallel Detail Join

Parallel detail join solves the problem of producing a meaningful result from a many-to-one-to-many relationship using a single structured query language (SQL) statement.

Figure 7:
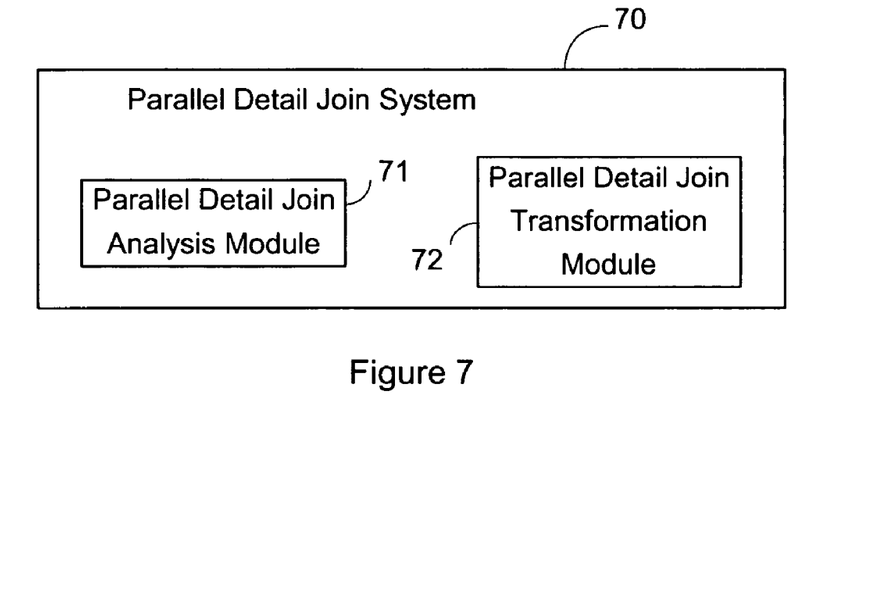
FIG. 7 shows an example of a parallel detail join system for merging elements in a plurality of tables, in accordance with an embodiment of the present invention.

FIG. 7 shows an example of a parallel detail join system 70 for merging elements in a plurality of tables, in accordance with an embodiment of the present invention. The parallel detail join system 70 comprises a parallel detail analysis module 71 for obtaining related elements in a plurality of tables, and a parallel detail transformation module 72 for merging the related elements in a singe table. The related elements may have different cardinalities in each original table. The related elements are merged such that the number of rows equals the largest cardinality and the number of columns equals the number of tables.

The parallel detail join system 70 may be implemented as a component of the report server 13, or as a component of the query engine 15 to a data access environment 10. Alternatively, the parallel detail join system 70 may be implemented as a component of the database server 12. A further alternative has the parallel detail join system 70 implemented as a separate component between the report server 13 and the database server 12 in a data access environment 10.

Figure 8:
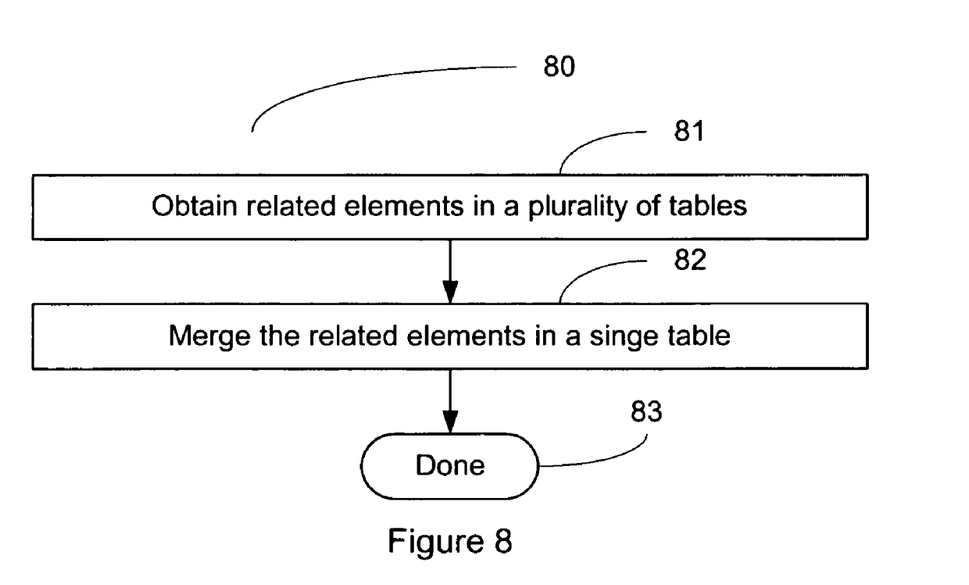
FIG. 8 shows in a flowchart an example of a method of merging elements in a plurality of tables, in accordance with an embodiment of the parallel detail join system.

FIG. 8 shows in a flowchart an example of a method of merging elements in a plurality of tables (80), in accordance with an embodiment of the parallel detail join system 60. The method (80) begins with obtaining related elements in a plurality of tables (81). Next, the elements are merged into a single table (82). The method (80) is done (83).

Advantageously, the parallel detail join system reduces processing that might otherwise be required on the application server, thereby improving performance in many cases.

Figure 9:
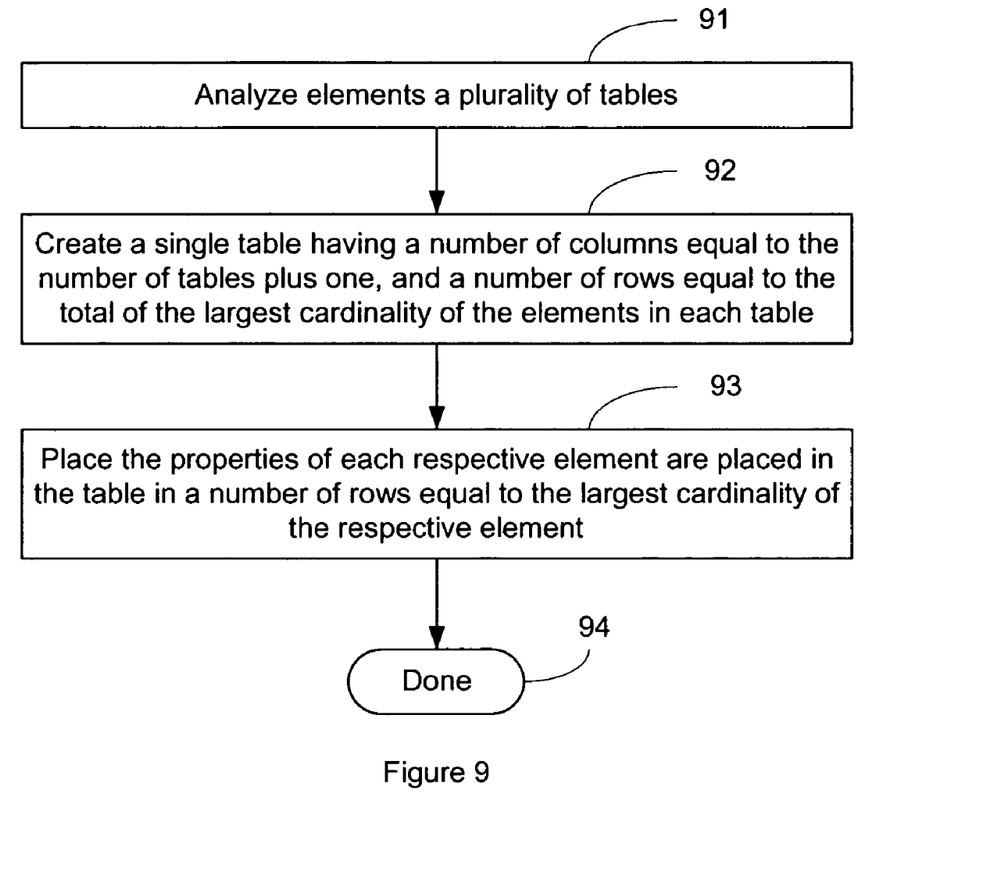
FIG. 9 shows in a flowchart another example of a method of merging elements in a plurality of tables, in accordance with an embodiment of the parallel detail join system.

FIG. 9 shows in a flowchart another example of a method of merging elements in a plurality of tables (90), in accordance with an embodiment of the parallel detail join system 60. The method (90) begins with analyzing elements in a plurality of tables (91). Next, a single table is created, having a number of columns equal to the number of tables plus one, and a number of rows equal to the total of the largest cardinality of the elements in each table (92). Next, the properties of each respective element are placed in the table in a number of rows equal to the largest cardinality of the respective element (93). The method (90) is done (94).

Assume we have the following sample database. There is a one-to-many relationship between EMPLOYEES and BILLINGS, and a one-to-many relationship between EMPLOYEES and SKILLS. The BILLINGS and SKILLS tables may have different cardinalities.

Employees

| ID | NAME |
|---|---|
| 1 | Stan |
| 2 | Mike |
| 3 | John |

Billings

| ID | AMOUNT |
|---|---|
| 1 | 100 |
| 1 | 400 |
| 1 | 500 |
| 3 | 600 |

Skills

| ID | SKILL |
|---|---|
| 1 | Cobol |
| 1 | C |
| 2 | Pascal |
| 2 | Visual Basic |

The desired result is shown below:

| ID | NAME | AMOUNT | SKILL |
|---|---|---|---|
| 1 | Stan | 100 | Cobol |
| 1 | Stan | 400 | C |
| 1 | Stan | 500 | |
| 2 | Mike | | Pascal |
| 2 | Mike | | Visual Basic |
| 3 | John | 600 | |

This can be accomplished with the following SQL-99 query:

```
SELECT COALESCE( T1.ID, T2.ID), COALESCE( T1.NAME,
       T2.NAME ), T1.AMOUNT, T2.SKILL
FROM (   SELECT T1.ID, T1.NAME, T2.AMOUNT,
            ROW_NUMBER( ) OVER ( PARTITION BY T1.ID
            ORDER BY T1.ID ) RS
         FROM EMPLOYEES T1 LEFT OUTER JOIN BILLINGS
         T2 ON T1.ID = T2.ID )
T1
         FULL OUTER JOIN
         ( SELECT T1.ID, T1.NAME, T2.SKILL,
            ROW_NUMBER( ) OVER ( PARTITION BY
            T1.ID ORDER BY T1.ID )
RS
         FROM   EMPLOYEES T1 LEFT OUTER JOIN SKILLS T2
            ON T1.ID = T2.ID ) T2
         ON    T1.ID = T2.ID
         AND   T1.RS = T2.RS
```

The systems and methods according to the present invention may be implemented by any hardware, software or a combination of hardware and software having the above described functions. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A structured query language (SQL) tagging system, implemented in a data processing device associated with a database system, for tagging SQL components of a SQL query string, the system comprising:

a parsing unit, of the data processing device, parsing the SQL query string into the SQL components of the SQL query string;

an analysis unit, of the data processing device, analyzing the parsed SQL components of the SQL query string and determining tags to be associated with the SQL components of the parsed SQL query string, the analysis unit further applying the determined tags to the associated SQL components of the parsed SQL query string; and a string generation unit, of the data processing device, for concatenating the SQL components of the parsed SQL query string with the associated tags to generate the tagged SQL query string comprising the components of the SQL query string and the applied tags, wherein the tags are extensible markup language (XML) tags selected from a predefined group of XML tags describing components of SQL queries.

2. The system as claimed in claim 1, further comprising a repository for holding the group of XML tags.

3. A method, in a data processing device, of tagging structured query language (SQL) components of a SQL statement, the method comprising:

parsing, by the data processing device, an incoming SQL statement into SQL components and producing an input tree representation of the parsed SQL statement;

traversing, by the data processing device, the input tree representation and determining a tag associated with the SQL components in the input tree representation; and generating, by the data processing device, a tagged SQL query string comprising the SQL statement with embedded tags associated with the SQL components of the SQL statement, wherein the embedded tags are extensible markup language (XML) tags selected from a predefined group of XML tags describing components of SQL queries.

4. A method, in a data processing device, of tagging structured query language (SQL) components of a SQL query string, the method comprising:

parsing, by the data processing device, the SQL query string into the SQL components of the SQL query string;

analyzing, by the data processing device, the parsed SQL components of the SQL query string and determining tags associated with the SQL components of the parsed SQL query string;

applying, by the data processing device, the determined tags to the associated SQL components of the parsed SQL query string; and concatenating, by the data processing device, the SQL components of the parsed SQL query string with the associated tags to generate the tagged SQL query string comprising the components of the SQL query string and the applied tags, wherein the tags are extensible markup language (XML) tags selected from a predefined group of XML tags describing components of SQL queries.

5. The method as claimed in claim 4, wherein the analyzing step comprises the steps of:

comparing a parsed SQL component with a collection of tags; and determining which tag in the collection of tags is associated with the parsed SQL component.

6. The method as claimed in claim 4, wherein the step of applying comprises the step of adding the associated tag to the parsed SQL component.

7. The method as claimed in claim 4, wherein the step of parsing includes the step of:
   parsing an incoming SQL statement into SQL components and producing an input tree representation of the parsed SQL statement.

8. The method as claimed in claim 7, wherein the steps of analyzing and concatenating include the step of:
   traversing the input tree representation and determining a tag associated with the SQL components in the input tree representation; and
   generating the tagged SQL query string comprising the SQL statement with embedded tags associated with the SQL components of the SQL statement.

9. The system as claimed in claim 1, wherein the associated tags are predetermined and allow for the extraction of information of the SQL query string by a query engine.

10. The method as claimed in claim 4, wherein the associated tags are predetermined and allow for the extraction of information of the SQL query string by a query engine.

11. A computer-readable storage medium having computer readable code embodied therein for execution in a computer to perform a method comprising:
   parsing a SQL query string into the SQL components of the SQL query string;
   analyzing the parsed SQL components of the SQL query string and determining tags associated with the SQL components of the parsed SQL query string;
   applying the determined tags to the associated SQL components of the parsed SQL query string; and
   concatenating the SQL components of the parsed SQL query string with the associated tags to generate the tagged SQL query string comprising the components of the SQL query string and the applied tags, wherein the tags are extensible markup language (XML) tags selected from a predefined group of XML tags describing components of SQL queries.

12. A computer program product on a computer-readable storage medium for execution in a data processing device to implement:
   a parsing unit, of the data processing device, that parses the SQL query string into the SQL components of the SQL query string;
   an analysis unit, of the data processing device, that analyzes the parsed SQL components of the SQL query string and determines tags to be associated with the SQL components of the parsed SQL query string, the analysis unit further applying the determined tags to the associated SQL components of the parsed SQL query string; and
   a string generation unit, of the data processing device, that concatenates the SQL components of the parsed SQL query string with the associated tags to generate the tagged SQL query string comprising the components of the SQL query string and the applied tags, wherein the tags are extensible markup language (XML) tags selected from a predefined group of XML tags describing components of SQL queries.

13. The system of claim 1, wherein the data processing device is a report server associated with the database system.

14. The system of claim 1, wherein the data processing device is a database server associated with the database system.

15. The system of claim 1, wherein the data processing device is a separate data processing device coupled to a report server and a database server of the database system.

16. The method of claim 4, wherein the data processing device is one of a report server associated with a database system or a database server associated with a database system.

17. The method of claim 4, wherein the data processing device is a separate data processing device coupled to at least one of a report server or a database server of a database system.

18. The computer readable storage medium of claim 11, wherein the data processing device is one of a report server associated with a database system or a database server associated with a database system.

19. The computer readable storage medium of claim 11, wherein the data processing device is a separate data processing device coupled to at least one of a report server or a database server of a database system.

20. The computer program product of claim 12, wherein the data processing device is one of a report server associated with a database system, a database server associated with a database system, or a separate data processing device coupled to at least one of a report server or a database server of a database system.

* * * * *